(12) United States Patent
Drobot et al.

(10) Patent No.: US 6,341,118 B1
(45) Date of Patent: Jan. 22, 2002

(54) MULTIPLE CHANNEL SCANNING DEVICE USING OVERSAMPLING AND IMAGE PROCESSING TO INCREASE THROUGHPUT

(75) Inventors: Adam Thomas Drobot, Annandale; Albert Myron Green, Alexandria; Edward Alan Phillips, Great Falls; Robert Courtney White, Fairfax; Newell Convers Wyeth, Oakton, all of VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/088,780

(22) Filed: Jun. 2, 1998

(51) Int. Cl.$^7$ .................................................. G11B 7/00
(52) U.S. Cl. ............... 369/118; 369/44.37; 369/112.27; 369/121
(58) Field of Search ................................ 369/44.12, 45, 369/44.34, 44, 44.37, 112, 118, 108, 110, 121, 122, 112.23, 112.27, 112.09; 250/227.11, 227.14, 227.21, 573, 201.5; 385/33, 14, 115, 8, 11, 135; 372/102, 101, 50, 96

(56) References Cited

U.S. PATENT DOCUMENTS

| | | | |
|---|---|---|---|
| 3,112,360 A | 11/1963 | Gregg | ......................... 369/112 |
| 3,220,013 A | 11/1965 | Harris | ......................... 347/260 |

(List continued on next page.)

FOREIGN PATENT DOCUMENTS

| | | |
|---|---|---|
| DE | 37 17 604 | 4/1990 |
| DE | 44 01 972 | 7/1995 |
| EP | 0 092 420 | 10/1983 |
| EP | 0 646 908 A | 4/1995 |
| EP | 0 784 314 A | 7/1997 |
| WO | WO 88/03293 | 5/1988 |
| WO | WO 95/25971 | 9/1995 |

OTHER PUBLICATIONS

"Miniature Micro–Optical Scanners", Optical Engineering, vol. 33, No. 11, Nov. 1, 1994, pp. 3616–3623 (Motamedi, M.E. et al).

Abstract of D.E. Brei and J. Blechschmidt, "Design and Static Modeling of a Semiconductor Polymeric Piezoelectric Microactuator", (JMEMS, vol. 1, No. 3, p. 106).

Abstract of K. Minami, S. Kawamura, and M. Esashi, "Fabrication of Distributed Electrostatic Micro Actuator (DEMA)", (JMEMS, vol. 2, No. 3, p. 121 et. seq.).

Abstract of Q. Meng, M. Mehregany, and R. L. Mullen, "Theoretical Modeling of Microfabricated Beams with Elastically Restrained Supports," (JMEMS, vol. 2, No. 3, p. 128 et. seq.).

Abstract of M. Ataka, A. Omodaka, N. Takeshima, and H. Fujita, "Fabrication and Operation of Polyimide Bimorph Actuators for a Cillary Motion System", (JMEMS, vol. 2, No. 4, p. 146).

(List continued on next page.)

*Primary Examiner*—David Hudspeth
*Assistant Examiner*—Kim-Kwok Chu
(74) *Attorney, Agent, or Firm*—Banner & Witcoff, Ltd.

(57) ABSTRACT

A multiple channel scanning device has a scanning head with multiple columns of apertures that emit light which is projected to a small spot on the surface of a recorded medium. Light returned from the medium reenters the apertures and is conducted to detectors. In a preferred embodiment, the scanning head is rapidly oscillated (may be on the order of 100 kHz rate), in a direction parallel to the columns. The medium is moved in a direction perpendicular to the columns so that the same recorded regions pass beneath successive columns of apertures. The data from the detectors is image-processed to improve the quality of data reading using the successive readings of the same data regions. This allows errors to be corrected and throughput to be improved.

26 Claims, 11 Drawing Sheets

U.S. PATENT DOCUMENTS

| | | | |
|---|---|---|---|
| 3,892,468 A | 7/1975 | Dunguay | 250/227.11 |
| 3,941,927 A | 3/1976 | Russell | 359/196 |
| 4,058,736 A | 11/1977 | Takahashi et al. | 250/573 |
| 4,090,206 A | 5/1978 | Pfeiffer et al. | 347/244 |
| 4,135,083 A | 1/1979 | Van Alem et al. | 250/201.5 |
| 4,193,091 A | 3/1980 | Kleuters et al. | 369/112 |
| 4,234,788 A | 11/1980 | Palmer et al. | 250/227 |
| 4,283,777 A | 8/1981 | Miyazawa | 369/32 |
| 4,286,145 A | 8/1981 | Palmer | 235/462 |
| 4,337,531 A | 6/1982 | Willemsen | 369/45 |
| 4,460,989 A * | 7/1984 | Russell | 369/110 |
| 4,482,986 A | 11/1984 | Noda et al. | 369/44 |
| 4,500,204 A | 2/1985 | Ogura | 356/318 |
| 4,507,765 A | 3/1985 | Suzuki et al. | 369/45 |
| 4,544,259 A | 10/1985 | Kanaoka et al. | 355/1 |
| 4,564,268 A | 1/1986 | Tatsuno et al. | 372/101 |
| 4,566,015 A | 1/1986 | MacKenzie | 347/242 |
| 4,572,949 A | 2/1986 | Bowers et al. | 250/227 |
| 4,660,094 A | 4/1987 | Yoshimoto et al. | 358/406 |
| 4,737,946 A | 4/1988 | Yamashita et al. | 369/45 |
| 4,744,073 A | 5/1988 | Sugiki | 369/112 |
| 4,755,668 A | 7/1988 | Davis | 250/227 |
| 4,763,973 A | 8/1988 | Inoue et al. | 385/12 |
| 4,764,738 A * | 8/1988 | Fried | 385/8 |
| 4,765,703 A * | 8/1988 | Suzuki et al. | 385/8 |
| 4,767,210 A | 8/1988 | Kashyap | 356/345 |
| 4,771,415 A | 9/1988 | Taki | 369/112 |
| 4,815,807 A | 3/1989 | Kaneko et al. | 385/33 |
| 4,858,215 A | 8/1989 | Yano et al. | 369/45 |
| 4,991,160 A | 2/1991 | Premji | 369/44.12 |
| 5,001,338 A | 3/1991 | Boero | 250/227.21 |
| 5,010,346 A | 4/1991 | Hamilton et al. | 250/227.14 |
| 5,031,187 A * | 7/1991 | Orenstein et al. | 372/50 |
| 5,070,488 A | 12/1991 | Fukushima et al. | 369/103 |
| 5,095,472 A | 3/1992 | Uchino et al. | 369/44.14 |
| 5,109,459 A | 4/1992 | Eibert et al. | 385/115 |
| 5,121,449 A | 6/1992 | Shiba et al. | 385/14 |
| 5,128,915 A | 7/1992 | Yamashita et al. | 369/44.12 |
| 5,144,604 A | 9/1992 | Sugiura | 369/44.12 |
| 5,144,616 A | 9/1992 | Yasukawa et al. | 369/122 |
| 5,195,152 A | 3/1993 | Gupta | 369/44.12 |
| 5,220,450 A | 6/1993 | Iizuka | 359/205 |
| 5,278,812 A | 1/1994 | Adar et al. | 369/44.12 |
| 5,289,454 A | 2/1994 | Mohapatra et al. | 369/112 |
| 5,293,291 A | 3/1994 | Ohki et al. | 369/44.12 |
| 5,317,148 A | 5/1994 | Gray et al. | 250/227.26 |
| 5,354,985 A | 10/1994 | Quate | 250/234 |
| 5,390,157 A | 2/1995 | Revelli, Jr. | 369/44.12 |
| 5,414,785 A | 5/1995 | Bergmann | 385/24 |
| 5,416,881 A | 5/1995 | Ikeda | 385/135 |
| 5,422,469 A | 6/1995 | Bard et al. | 250/227.26 |
| 5,444,689 A | 8/1995 | Ohki et al. | 369/109 |
| 5,452,382 A | 9/1995 | Shionoya et al. | 385/11 |
| 5,465,243 A | 11/1995 | Boardman et al. | 369/53.29 |
| 5,483,515 A * | 1/1996 | Cheng et al. | 369/124 |
| 5,508,990 A * | 4/1996 | Nagasaki et al. | 369/44.37 |
| 5,564,268 A | 10/1996 | Thompson | 57/3 |
| 5,602,863 A * | 2/1997 | Itagaki | 372/50 |
| 5,661,591 A | 8/1997 | Lin et al. | 359/290 |
| 5,727,098 A | 3/1998 | Jacobson | 385/31 |
| 5,802,222 A | 9/1998 | Rasch et al. | 385/1 |
| 5,940,564 A | 8/1999 | Jewell | 385/93 |
| 6,084,848 A * | 7/2000 | Goto | 369/121 |

OTHER PUBLICATIONS

Abstract of J.G. Smits and A. Ballato, "Dynamic Admittance Matrix of Piezoelectric Cantilever Bimorphs", (JMEMS, vol. 3, No. 3, p. 105 et. seq.).

Abstract of J.W. Judy, R.S. Muller, and H.H. Zappe, "Magnetic Microactuation of Polysilicon Flexure Structures", (JMEMS, vol. 4, No. 4, p. 162).

Abstract of T.S. Low and W. Guo, "Modeling of a Three–Layer Piezoelectric Bimorph Beam with Hysteresis", (JMEMS, vol. 4, No. 4, p. 230).

Abstract of Yuji Uenishi, Hidenao Tanaka, and Hiro Ukita, "AlGaAs/GaAs micromachining for monolithic integration of optical and mechanical components", (Proc. SPIE vol. 2291, p. 82–91, Integrated Optics and Microstructures II, Massood Tabib–Azar; Dennis L. Polla; Ka–Kha Wong; Eds. Oct. 1994).

* cited by examiner

MULTIPLE CHANNEL SCANNING DEVICE USING OVERSAMPLING AND IMAGE PROCESSING TO INCREASE THROUGHPUT

CROSS REFERENCE TO RELATED APPLICATIONS

The respective entireties of the following United States patents and patent applications, filed concurrently herewith, are hereby incorporated by reference: U.S. Pat. No. 6,091,067 (Scanning Device Using Fiber Optic Bimorph), U.S. Pat. No. 6,137,105 (Multiple Parallel Source Scanning Device), U.S. application Ser. No. 09/088,781 (Method and Apparatus for Controlling the Focus of a Read/Write Head for an Optical Scanner), U.S. Pat. No. 6,246,658 (Multiple Channel Scanning Device Using Optoelectronic Switching), U.S. Pat. No. 6,166,756 (Multiple Channel Data Writing Device).

BACKGROUND OF THE INVENTION

Various optical scanners are known for such applications as data storage, bar code reading, image scanning (surface definition, surface characterization, robotic vision), and lidar (fight detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector 32. To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, or a lens driven galvanometrically or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally attended by high costs for mass manufacture, assembly, and alignment.

scanning application. For raster scanning to cover extended surface areas, the emphasis is on speed, area resolution, and scan efficiency. Wide bandwidth is needed if the surface is to be color-scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (cells) in which some optical property has been set at one of two or more values to represent digital information. Commercial read/write heads scan the media with a diffraction-limited spot, typically produced by focusing a collimated laser beam with a fast objective lens system as shown in FIG. 1. A fast objective lens, one with a high numerical aperture, achieves a small spot size by reducing Fraunhofer-type diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit-cells must be followed by the spot with sufficient precision to avoid missing any bit cells. The fine tracking is achieved by servo mechanisms moving the objective lens relative to the head assembly. An auto-focus servo system is also necessary to maintain the diffraction limited spot size because the medium motion inevitably causes some change in the lens/medium separation with time. Proper focus adjustment is possible because the medium is flat and smooth. Such a surface reflects incident light in well-defined directions like a mirror. Light reflected from the medium is collected by focusing optics and sent back along the collimated beam path for detection.

Scanning by several spots simultaneously is used to achieve high data rates through parallelism in one known system called the CREO® optical tape system.

The reading of optically stored data is a prime application example of this type of optical scanning. Commercial read/write heads for optical data storage systems scan with a diffraction-limited light spot, typically produced by focusing a collimated laser beam with a fast objective lens system as shown in FIG. 1. The spot is scanned by moving an

TABLE 1

Performance of Conventional Beam Deflectors for Optical Scanning

| Parameter | Polygonal Mirrors | Galvano-Driven Mirrors | Hologons (Transmission) | Acousto-Optic Deflectors |
|---|---|---|---|---|
| Wavefront Distortion | $\lambda/8$ at 0.55 $\mu$m | $\lambda/8$ at 0.55 $\mu$m | $\lambda/6$ at 0.55 $\mu$m | $\lambda/2$ at 0.55 $\mu$m |
| Area resolution (spot-widths/sec) | 25,000 (scan lens limited) | 25,000 (scan lens limited) | 25,000 (scan lens limited) | 1,000 (scan lens limited) |
| Cross-axis error | 10 arc sec (uncorrected) | 1–2 arc sec (uncorrected) | 10 arc sec | 0 |
| Speed (spot widths/sec) | $1 \times 10^8$ | $2 \times 10^6$ | $2 \times 10^7$ | $2.8 \times 10^7$ |
| Bandwidth | 0.3–20 $\mu$m | 0.3–20 $\mu$m | Monochromatic | monochromatic |
| Scan efficiency | 80–100% | 65–90% | 90% | 60–80% |

(from The Photonics Design and Applications Handbook 1993, Laurin Publishing Co., Inc., p. H449)

The performance parameters listed in Table 1 assume different levels of importance depending on the optical assembly of optical components (turning mirror, objective lens, position actuators) over the optical storage medium, either along a radius of a disc spinning under the spot or across the width of a tape moving through the head. The assembly moves in one dimension along the direction of the collimated laser beam. Light reflected from the storage medium is collected by the focusing optics and sent back along the collimated beam path. It is diverted out of the source path by a beam splitter 31 for routing to a detector 32. However, because of the collimated beam optical design of this system, light entering the return path from areas outside the scanning spot can propagate some distance back toward the detector before the angular displacement is transformed into sufficient spatial displacement to be caught by an aperture stop. This extraneous light is more of a problem in a multiple spot system in which several areas of the scanned surface are illuminated at once, and crosstalk between adjacent and nearby spots is likely. The use of discrete optical components in such devices to eliminate this effect, poses great difficulty and cost for mass-manufacture because of the requirement of precise optical alignment of components.

One scanning device that avoids reliance on discrete optical elements to achieve scanning is described in U.S. Pat. No. 4,234, 788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber as the fiber is forced back and forth repeatedly. To make the fiber wiggle back and forth, an alternating electric field, generally perpendicular to the axis of the fiber, is generated. The fiber is coated with a metallic film. A charge is stored on the film, especially near the tip, by forming a capacitance with a metallized plate oriented perpendicularly to the fiber axis (optically at least partly transparent). The stored charge makes the fiber responsive to the electric field.

A drawback of this device is the limit on the speeds with which the fiber can be made to oscillate. The device requires a series of elements to move the fiber: an external field-generating structure, a DC voltage source to place charge on the fiber coating, and an AC source to generate the external field. Another drawback of this prior art mechanism is the inherent problem of stress fractures in the fiber optics. Bending the fiber repeatedly places serious demands on the materials. Problems can wise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very dose to the scanned surface as may be desired for certain optical configurations.

Another prior art scanning device is described in U.S. Pat. No. 5,422, 469. This patent specification describes a number of different devices to oscillate the end of an optical light guide or optical fiber. One embodiment employs a piezoelectric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezo-electric bimorph However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

A multiple channel scanning device has a scanning head with multiple columns of apertures that emit light which is imaged by a lens onto the surface of a recorded medium. Light returned from the medium is imaged back onto the apertures and conducted to detectors. In a preferred embodiment, the scanning head is rapidly oscillated (may be on the order of 100 kHz rate), in a direction parallel to the columns. The medium is moved in a direction perpendicular to the columns so that the same recorded regions pass beneath successive columns of apertures. The data from the detectors is image-processed to improve the quality of data-reading using the successive readings from the same data regions. This allows errors to be corrected and through-put to be improved. In an alternative embodiment, scan spots are swept over nearly the same, or the same, regions to achieve oversampling.

According to an embodiment, the invention provides a scanning device for scanning a target surface with data written on it. The data is arranged in adjacent data cells on the target surface. Each of the cells has one of a set of possible configurations representing data. For example, a cell could be highly reflective to represent a "1" and less reflective to represent a "0." The scanning device has a read/write head, with at least one laser source, that transmits light to an array of output apertures from which light is emitted. The light returned from the surface is received through an array of input apertures. The read/write head and the target surface are mutually supported to move relative to each other to scan the target surface. The array of output apertures is arranged such that some scan substantially the same cells of the target surface. The read/write head includes detectors that detect the returned light and send resulting signals to an image processor. The image processor generates an estimate of a configuration of each cell from the redundant or quasi-redundant data and generates a signal stream representing the estimate. In a variation, the output apertures are coaxial with the input apertures. In another variation, the read/write head has an optoelectronic chip with internal light guides formed in it, each of the light guides being connected to one of the output apertures. In still another variation, the optoelectronic chip has at least one optical switch to modulate an output of either a reading laser source or a writing laser source to allow the scanning device to write data as well as read it. The light sources of the invention, for writing purposes, are, preferably, modulated by optical switches that selectively direct the output between a write output aperture and another direction leading ultimately to dissipation of energy of the writing laser source. This way, the writing laser source can operate continuously during writing. Multiple reading laser sources may be connected to an array of light guides interconnected to split light from the multiple reading laser sources into multiple paths, each connected to a one of the output apertures. The array of light guides may be interconnected with respective optical switches controlled by a controller programmed to cause the laser output to be shared among multiple output apertures by alternately shunting the laser output to a first fraction of the output apertures and shunting the laser output to second fraction of the output apertures. The fractions could constitute just a single aperture.

According to another embodiment, the invention provides a scanning device for scanning a target surface with data written on it. The data is arranged in columns of adjacent data cells on the target surface. Each of the columns of data cells has one of a set of possible configurations representing data as discussed above. The device has a read/write head with an array of input apertures arranged in successive columns such that each of the columns receives light from the same one of the columns of data cells. There is at least one detector connected to detect light received by the array of input apertures. The detector generates a signal indicating an estimate of one of the possible configurations by combining information derived from light received by all of the successive columns. In a variation, the detector combines the information by detecting light from each of the columns and synthesizing an improved estimate of the one of the possible configurations from the combination of signals generated.

According to still another embodiment, the invention provides a scanning device for scanning a target surface that has data written thereon, the data is arranged in columns of adjacent data cells on the target surface. Each of the columns of data cells has one of a set of possible configurations representing data. The device has a scanning head with an array of input apertures arranged in successive columns so each of the columns receives light returned from the columns of data cells passing under it. Also at least one detector is connected to detect light received by the array of input apertures. The detector generates a signal indicating an estimate of one of the possible configurations by combining information derived from light received by all of the successive columns. In a variation, the scanning head has at least one laser connected to conduct light so that it is emitted from the array of input apertures. In this way, the array of input apertures functions as an array of output apertures from which light is emitted. In another variation, an imaging optical element positioned between the scanning head and the target surface images light emitted from the output apertures onto the target surface. The light from the same one of the columns of data cells is light emitted from the array of output apertures, returned from the target surface, and imaged by the imaging optical element back onto the input apertures. In another variation, there is an array of output apertures, each being respective of one of the array of input apertures. Also, the scanning head includes a light guide leading from each of the input apertures to the respective detector.

According to still another embodiment, the invention provides a method of reading data from a recorded surface that has successive columns of data cells. The successive columns have at least one row of the data cells. The method has the following steps: Moving the recorded surface such that light from a first output aperture is focused onto a first of the successive columns. Receiving light returned from the recorded surface responsively to the first step of moving. Detecting light returned from the recorded surface and storing a first result thereof Moving the recorded surface such that light from a second output aperture is focused onto the first of the successive columns. Receiving light returned from the recorded surface responsively to the second step of moving. Detecting light returned to the first input aperture and storing a second result thereof Calculating data represented by the first of the respective columns responsively to a computed combination of the first and second results. In a variation of the method, in the first step of receiving, light is received at a first input aperture corresponding to the first output aperture. In addition, in the second step of receiving, light is received at a second input aperture corresponding to the second output aperture.

According to still another embodiment, the invention provides a method of reading data from a recorded surface with successive columns of data cells. The successive columns comprise at least one row of the data cells. The method has the following steps: Moving the recorded surface such that light from a first output aperture is focused onto a first of the successive columns. Receiving light returned from the recorded surface responsively to the first step of moving. Detecting light returned from the recorded surface and storing a first result thereof Moving the recorded surface such that light from a second output aperture is focused onto the first of the successive columns. Receiving light returned from the recorded surface responsively to the second step of moving. Detecting light returned to the first input aperture and storing a second result thereof Calculating data represented by the first of the respective columns responsively to a computed combination of the first and second results. In a variation of the method, in the first step of receiving, light is received at a first input aperture corresponding to the first output aperture. In addition, in the second step of receiving, light is received at a second input aperture corresponding to the second output aperture.

According to another embodiment, the invention provides a scanning device for scanning a medium with data written on it. The data is arranged in columns of adjacent data cells on the target surface. Each of the columns of data cells has one of a set of possible configurations representing data The scanning device has a scanning head with an array of input apertures arranged in successive columns such that each of the columns receives light from the same one of the columns of data cells. In addition, at least one detector is connected to detect light received by the array of input apertures. The detector generates a signal indicating an estimate of a one of the possible configurations by combining information derived from light received by all of the successive columns. There is a frame connected to the scanning head. The medium is attachable to the frame such that the medium is movable relative to the read/write head. As a result, the media moves in a first direction relative to the read/write head. An oscillating motor connected between the frame and the read/write head oscillates the scanning head relative to the medium. As a result a spacing of the input apertures may exceed a spacing of the adjacent cells while still permitting light returned from substantially all of the adjacent cells to be detected by the detector. In a variation, the medium is moved continuously in the first direction at a constant speed. In another variation, the direction of an oscillation of the read/write head has a component substantially perpendicular to the first direction. In still another variation, the scanning head includes at least one laser connected to conduct light so that it is emitted from array of input apertures. As a result, the array of input apertures functions as an array of output apertures from which light is emitted. In still another variation there is an imaging optical element (e.g., a lens system) positioned between the scanning head and the target surface to image light emitted from the output apertures onto the target. The light from the same one of the columns of data cells is emitted and returned from the array of output apertures. This light is imaged by the same imaging optical element back onto the input apertures. In another variation, there is an array of detectors, each being respective of one of the input apertures. The scanning head includes a light guide leading from each of the input apertures to the respective detector.

The invention provides an essential component in an optoelectronic chip designed to direct the flow of light and modulate the light output in a multi-channel optical scanning head. The invention leads to a reliable, robust, manufacturable, low-cost component for optical scanning devices used for optical data storage, bar code readers, image scanning for digitization or xerography, laser beam printers, inspection systems, densitometers, and 3-dimensional scanning (surface definition, surface characterization, robotic vision). Speed and accuracy are enhanced through the use of image processing techniques applied to redundant and partly redundant data.

DETAILED DESCRIPTION OF THE EMBODIMENTS

Figure 1:
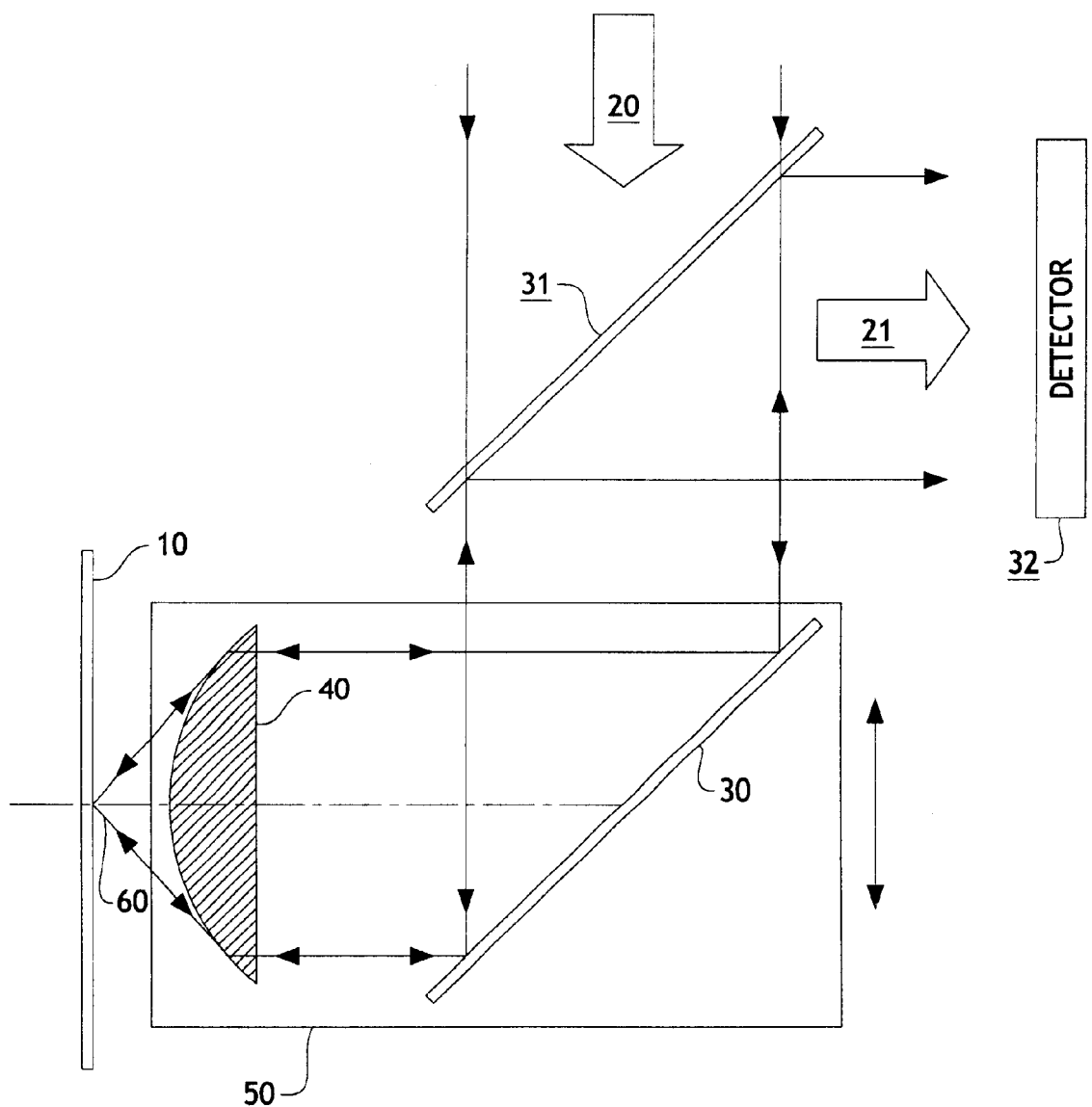
FIG. 1 is a ray trace diagram showing a scanning device according to the prior art.
Figure 2:
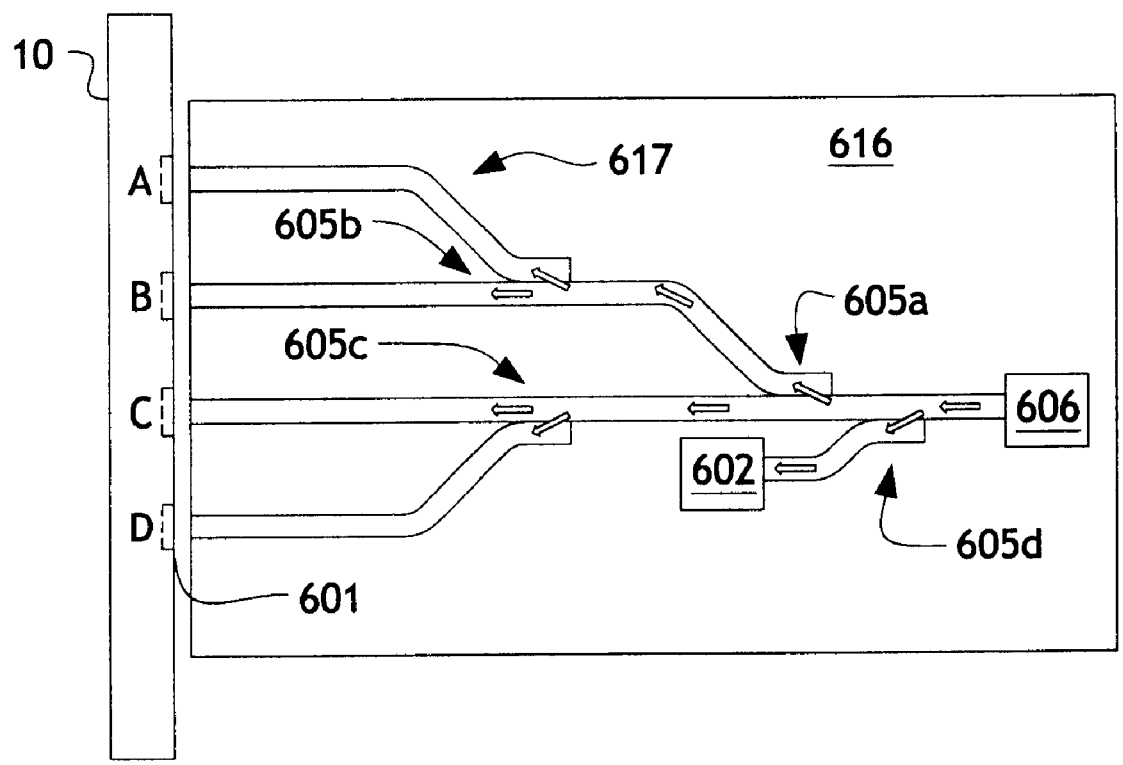
FIG. 2 is an illustration of an optoelectronic chip with integral waveguides, beam switches, a laser source, and beam dumps to allow the generation of a modulated signal using one laser source through multiple channels simultaneously.

Referring to FIG. 2, an optical scanning optoelectronic chip (OE) 616 has single laser source 606 that supplies light to multiple output apertures 601. Light emitted by laser 606 is guided by light guides 617 to various rail taps 605a–605c. Light from laser 606 is output, ultimately, through four output apertures 601 and applied to a scanned surface 10 at regions A, B, C, and D respectively. An optical switch 609 allows light from the laser to be directed to a beam dump 602 for dissipation and absorption of light energy. Switching the optical switch to a bypass position, in effect, modulates the output of light from the output apertures 601. Note that although in the embodiment shown, light is directed at the scanned region without any focusing optics, focusing optics may be used between the chip 616 and the target 10. Also note that although the chip 616 has an on-board laser, the laser could be a separate device and light applied to the light guide network through an input aperture.

The purpose of the optoelectronic chip in this system is to control the distribution of light from the laser sources to the optics that produce the scan and to direct the light signals returning from the scanned surface into the set of photo detectors. The integrated design allows the reduction of size, moving mass, component count, and manufacturing cost, compared to scanning systems with multiple discrete optics components. The optoelectronic chip design allows very accurate positioning of the light apertures by lithography without requiring monolithic, multiple output laser arrays. Parallel, integrated read/write channels with multiplexing have low cost per channel in a compact, robust configuration. Electro-optic switching is required to achieve the required data rates. The most cost effective technology available today is a polymer waveguide optoelectronic chip made using Photonic Large Scale Integration (PLSI).

The basic element of the PLSI chip is a one channel to two channel splitter, which can direct light from one input into one of two outputs, or split the intensity between the two outputs. This has been achieved easily by implementing waveguide structures containing non-linear optical polymeric material that has an index of refraction controlled by planar metal electrodes. This basic design allows for the fabrication of electro-optic switches and optical rail taps (directional couplers). Many such devices have been fabricated using simple, multi layer metal and polymer films photo lithographically defined with batch methods commonly employed for silicon chip fabrication.

The nominal multiplexed design of FIG. 2 uses four levels of switching between a single laser and four output channels directed respectively at target spots A–D. Assuming 80% transmission through each switch level, this results in as much as a 4 dB loss due to four switches through the output routing. Non-linear optical polymer waveguides can be fabricated that have no more than 0.1–0.2 dB losses at the operating wavelength. Using this estimate, the total losses in a single output channel with four levels of switching should be no more than 5 dB. In a design using a column of 64 spots for scanning a 4-mm width of surface in parallel (each spot scans±32 µm), 16 lasers are required. Each laser feeds a set of 4 output channels for write scanning at power levels high enough to affect the surface, but is switched among the channels at a 50% duty cycle. Read scanning generally requires much lower power levels. In this mode each laser can feed 16 channels, each at a 100% duty cycle. This extra capacity (compared to the write mode) is applied to achieve redundancy in reading by driving four parallel columns of 64 spots each; the columns scan the same surface area in sequence.

The light guides 617 (or optical wave guides) are formed directly in the chip 616 using fabrication techniques similar to those employed in the manufacture of integrated circuits. Optoelectronic chips are formed in a layer-by-layer process beginning with a suitable substrate such as silicon or glass wafer. A thin metal film is applied to the substrate and patterned to define electrodes and conductors. Next, a layer of material is added to form the optical waveguides and the material is patterned using photolithography. Switches may be formed by doping the material to create non-linear optical effects in the switching regions. In a purely additive process, additional material layers can be applied sequentially, on each of which additional optical paths, electrodes, and conductors can be formed.

Figure 3:
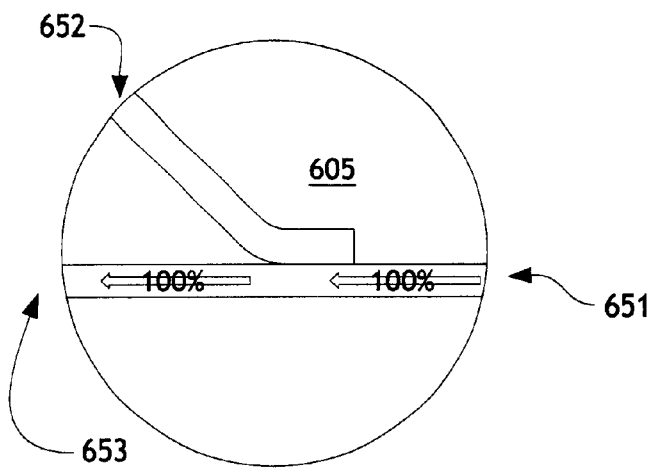
FIGS. 3, 4, and 5 illustrate the light flow taken by an optoelectronic switch in three respective modes.
Figure 4:
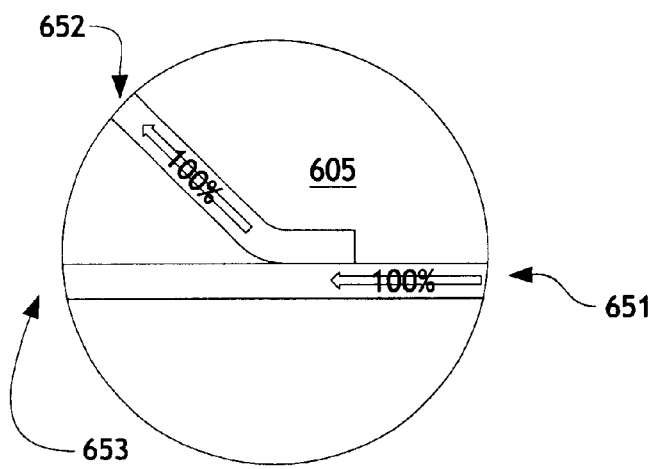
Figure 5:
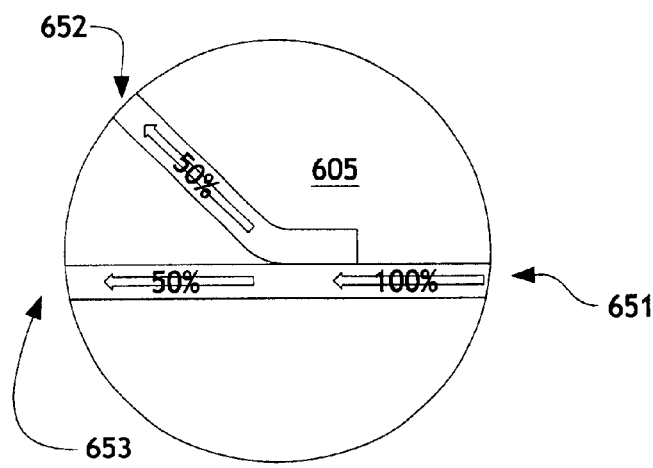

In the embodiment of FIG. 2, the chip 616 is configured to distribute the power input from one laser to four different output channels that will be used for scanning. The optical railtaps 605a through 605c are capable of selectively distributing the light power flow (minus internal losses of a few dB) among the various paths defined by light guides 617. Each optical rail tap 605a–605c, has at least three operating modes. Referring to FIG. 3, in the first, rail tap 605 permits all the light energy entering it at 651 to pass straight through to 653 (of course, there are losses). Referring to FIG. 4, in the second mode, all of the energy entering at 651 is bypassed to the branch at 652. Referring to FIG. 5, in the third mode, half the energy is bypassed to branch 652 and half permitted to pass straight through to branch 653. When all three of the rail taps 605a–605c are set to 50% bypass, the third mode, light passes through the output channels such that the energy arriving at the four output apertures is substantially equal. Referring now also to FIG. 2, if the three rail taps are operated sequentially as indicated in the following table, all of the laser output can be directed to the respective output apertures in succession.

| Target | Rail tap positions | | | |
|---|---|---|---|---|
| Region | 605a | 605b | 605c | 605d |
| A | mode 2 | mode 2 | no effect | Mode 1 |
| B | mode 2 | mode 1 | no effect | Mode 1 |
| C | mode 1 | no effect | mode 1 | Mode 1 |
| D | mode 1 | no effect | mode 2 | Mode 1 |

As the terms are used in the following discussion, "write" refers to making a durable change in a medium. The term "read" refers to the process of collecting information from a medium without permanently altering the medium. Assume that the maxim laser output is just enough (after system losses) to supply one channel with power for a writing scanning beam. A read/write head with the chip in FIG. 2 would use the switching functions of the optical railtaps to direct all of the laser power to each of the four output channels in succession for writing with precise synchronization to address each channel at the time when its output was positioned to write. Modulation of the writing power channel is done using the first rail tap 605d. The chip will use that switch to divert the laser output to the beam dump when the output channel is writing a space and supply the fill power when writing a mark. In this way, the laser can remain on at constant power with less stress and longer lifetime.

In many cases (e.g., reading and writing on phase-change optical storage media), much less light energy is used to read a pattern already written than to write the pattern. In that case, the chip 616 can divide the laser input power equally among the four output channels during the reading function, and four reading channels can be scanned simultaneously. For reading, each channel output is on all the time, and the scanned pattern on the surface modulates the return signal.

Figure 6:
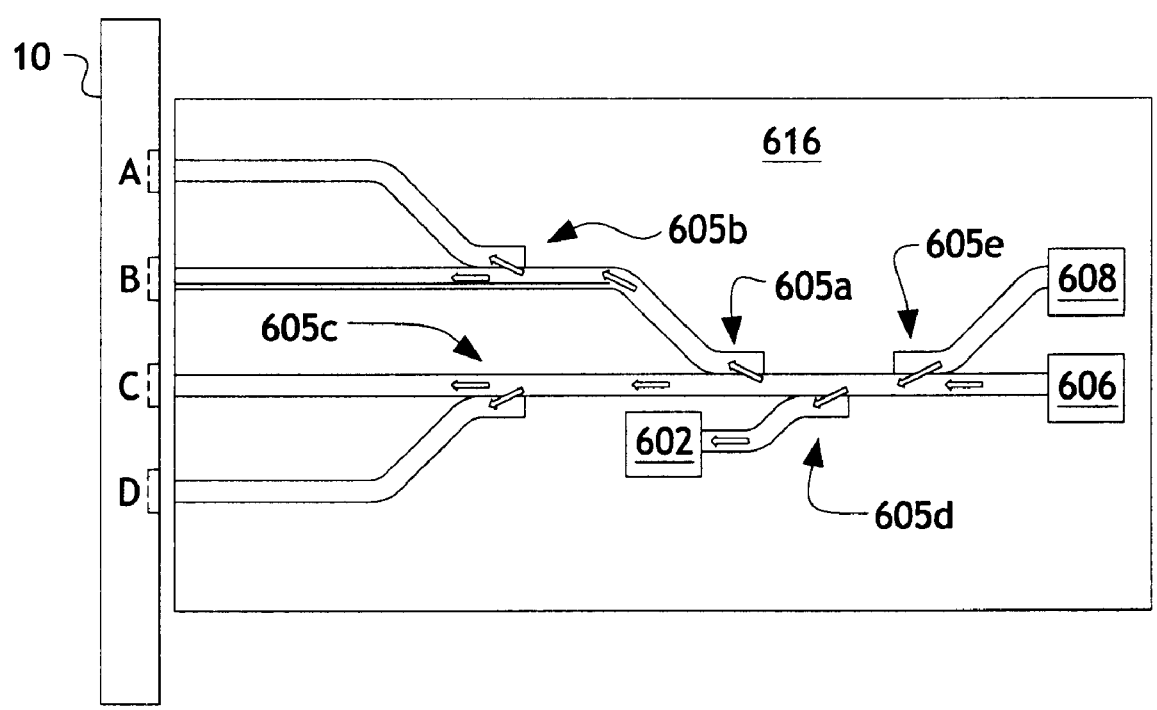
FIG. 6 shows an embodiment similar to that of FIG. 2 except that a backup laser is included with a crossover to the backup laser to supply the multiple channel light guide network.
Figure 7:
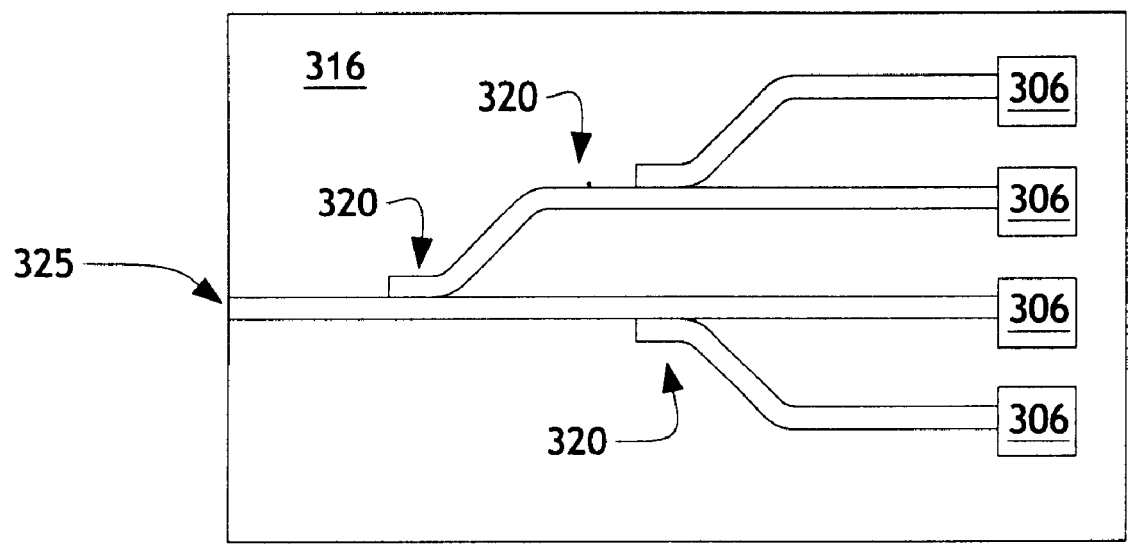
FIG. 7 is an illustration of a group of lasers formed in an optoelectronic chip interconnected by combiners to combine the energy of the lasers into one source.

Referring to FIG. 6, a chip 617 with an optical railtap 605e to allow crossover between the laser input channel, in case of a laser failure, allows a neighboring or backup laser 608 to be switched in to feed the outputs originally assigned to the source that failed 606. This crossover feature could also be used as shown in FIG. 7 to gang the output of several lasers to meet a scanning intensity requirement that exceeded the output of a single laser. The outputs of multiple lasers 306 can be combined for an application that requires an output intensity greater than a single laser can produce alone. Referring to FIG. 7, in an optoelectronic chip 316, multiple optical rail taps 320 are used to combine the outputs of more than one laser 306 that could be, for example, phase-locked. In this embodiment, four lasers combine to generate one combined output 325. This embodiment is particularly useful for use with laser devices such as vertical cavity sure emitting lasers (VCSELs) when used to write on materials requiring several milliwatts of power.

Using the invention, laser light can be allocated among several output channels with very fast switching rates for optimum use of power for both reading and writing applications. Cost savings can also be achieved. Single laser outputs requiring more power than can be achieved with a single laser can be supported by using the output-combining feature described. In addition, laser output can be modulated without directly varying laser output power, thus allowing the laser to operate in a continuous wave (CW), long-lifetime, stable mode.

Figure 8:
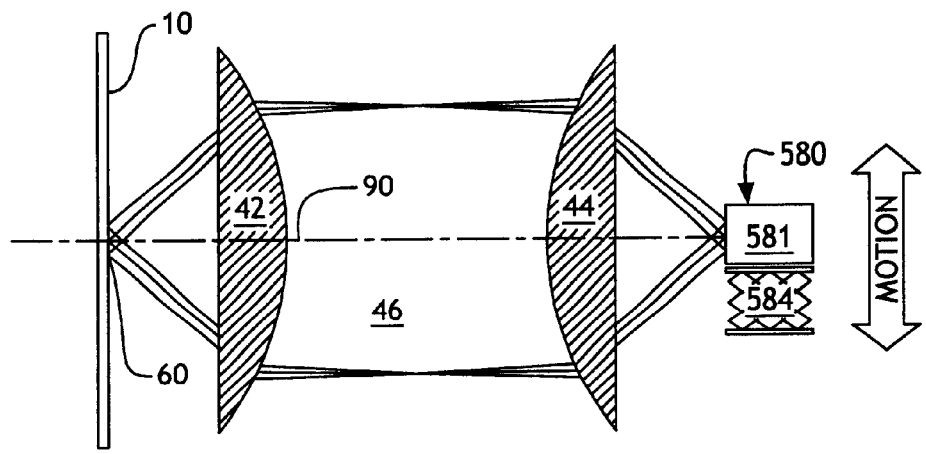
FIG. 8 is a ray trace diagram showing a multiple channel scanning head according an embodiment of the invention, where the imaging optics are fixed and the scanning head is oscillated by a MEMS motor to scan a region of a target surface.

Referring to FIG. 8, the small size of the embodiments discussed above lends itself to scanning using MEMS technology motors. In an embodiment of the invention, a multiple output scanning head, OE chip 581 according to any of the previous embodiments discussed, has multiple outputs, as described. Although the drawings only indicate schematic ray traces for three beams, it is understood that the drawing is compatible with any number of outputs. OE chip 581 is oscillated by a motor 584 based on microelectromechanical systems GEMS) technology. A scanning motion of multiple spots 60 can be obtained with this arrangement. The multiple focused spots 60 will scan over the surface 10 when the source array 580 is oscillated relative to the optical axis 90 of the lens system. In the embodiment of FIG. 8, the lens system 46 is held fixed and the optoelectronic chip 581 is oscillated. In a nominal lens system with 1:1 magnification, the spots move along the surface 10 the same distance as OE chip 581.

Figure 9:
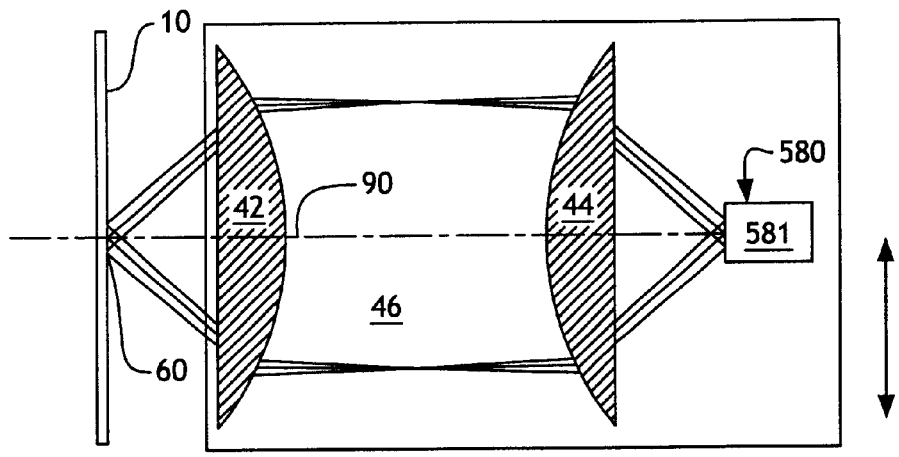
FIG. 9 is a ray trace diagram showing a multiple channel scanning head according an embodiment of the invention, where the imaging optics and scanning head are fixedly interconnected and oscillated as a unit by a MEMS motor to scan a region of a target surface.
Figure 10:
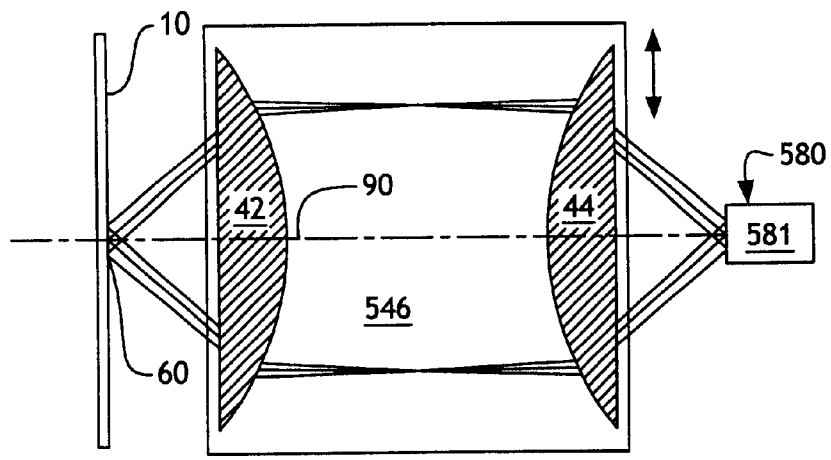
FIG. 10 is a ray trace diagram showing a multiple channel scanning head according an embodiment of the invention, where the imaging optics are oscillated as a unit by a MEMS motor to scan a region of a target surface.

Referring to FIG. 9, in an alternative embodiment, similar to that of FIG. 8, the focusing optics 46, as well as the light guide array 580, is oscillated. The focusing optics 46 and the source array 580 are supported on a single stage 521 which is oscillated by a motor (not shown). Referring to FIG. 10, in still another embodiment, lens system 546 is supported on stage 525 that is oscillated relative to both the scanned surface 10 and the source array 580. Preferably, the lens system is oscillated to cause a rotary motion since a purely lateral oscillation would not produce the same degree of oscillation in the focused spots 60.

Using the invention, laser light can be allocated among several output channels with very fast switching rates for optimum use of power for both reading and writing applications. Cost savings can also be achieved. Single laser outputs requiring more power than can be achieved with single laser can be supported by using the output-combining feature described. In addition, laser output can be modulated without directly varying laser output power, thus allowing the laser to operate in a continuous wave (CW), long-lifetime, stable mode.

Figure 11:
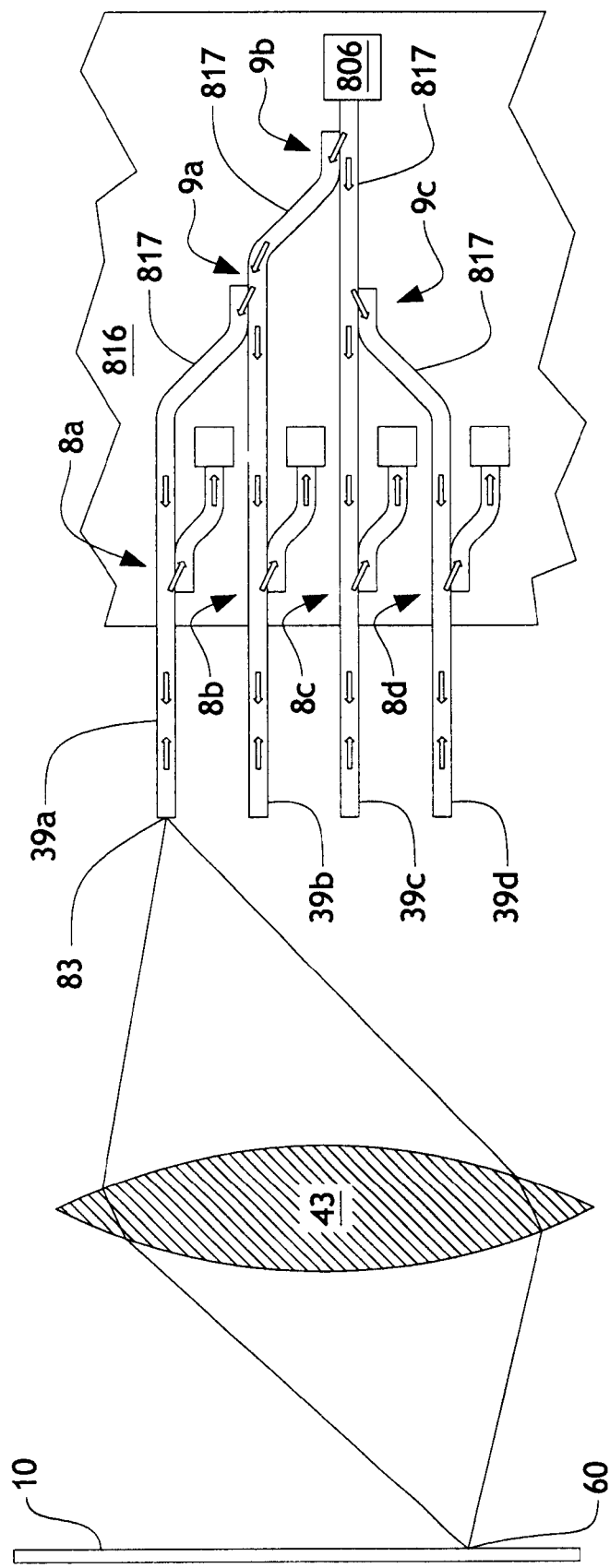
FIG. 11 illustrates a scanning head with fiber-optic light guides and multiple detectors for purposes of describing the scanning of a region simultaneously by multiple channels.

Referring to FIG. 11, a laser array 806 supplies scanning light to an array of light guides 817 formed in an optoelectronic chip package 816. Optical fibers 39*a*–39*d* protrude from the optoelectronic chip package 816 emitting light transmitted from light guides 817 at a high numerical aperture ratio from tips 83. The emitted light is imaged to a spot 60 on a target surface 10 by a lens (which could be lens system). Electro-optical switches 9*a*–9*c* are controlled to switch the laser source 806 sequentially among the four optical fibers 39*a*–39*d* to produce a series of scanning spots 60 in succession on target surface 10. Note that imaging using any of the above embodiments can be done using a focusing lens system as shown in the embodiment of FIG. 11 or by positioning the output channels very close to the target surface as shown in FIG. 2. Note also that while in the above embodiments, the output channels are oscillated by moving the entire optical circuit, it is possible to achieve the required oscillatory motion by vibrating the fibers by bending them using bimorph elements as described in the copending applications incorporated herein by reference. That is, the fibers can be moved by bimorph elements each driven by the same excitation voltage source. Or the fibers could be mounted to a stage, as discussed, and the stage oscillated. In the case of a moving stage, the fiber tip array should protrude only one or two fiber diameters from the chip and the entire chip moved with a fast "shaker" (e.g. MEMS electrostatic actuator, piezoelectric drive, etc.). In a nominal lens system design with 1:1 magnification, the spot moves along the scanned surface the same distance that the fiber tip moves perpendicular to the optical axis. If appropriate, magnification ratios other than 1:1 can be used to have the scanning spot move further than or less than the fiber tip moves. If the fiber tip moves in such a way that its tip does not move in a plane, the focusing lens system can, in some cases, be designed to compensate for this non-planar motion and maintain planar motion of the scanning spot if so desired. In addition, various ways of accomplishing this are discussed above.

Fabrication of edge-emitting laser diode arrays is a mature, advancing technology that provides compact, robust, and inexpensive multiple laser light sources with relatively small power requirements. For example, for an optical data storage scanner used with phase change media, a single package laser array with 8–16 lasers will fit this application by meeting the following laser requirements: (a) operation at good optical-out/electrical-in efficiency to provide CW power onto the optical media for writing (7–15 mW for 150 ns) and reading (10 $\mu$W–5 mW) after subtracting fiber optic transport and coupling losses and (b) operation at wavelengths appropriate for digital optical data storage (<1 $\mu$m).

Edge-emitting, single mode laser diode arrays with the required power at 830 nm wavelength are available off-the-shelf. Achieving smaller diffraction limited spot sizes for high density optical storage requires laser arrays with the shorter wavelengths now available in low-power discrete diode lasers (e.g. 670 nm at 15 mW). Vertical cavity surface emitting lasers (VCSELs) represent another configuration of solid state laser that have output beam characteristics more suited to optical scanners and are more amenable to incorporation in a single chip multiple device design.

Figure 12:
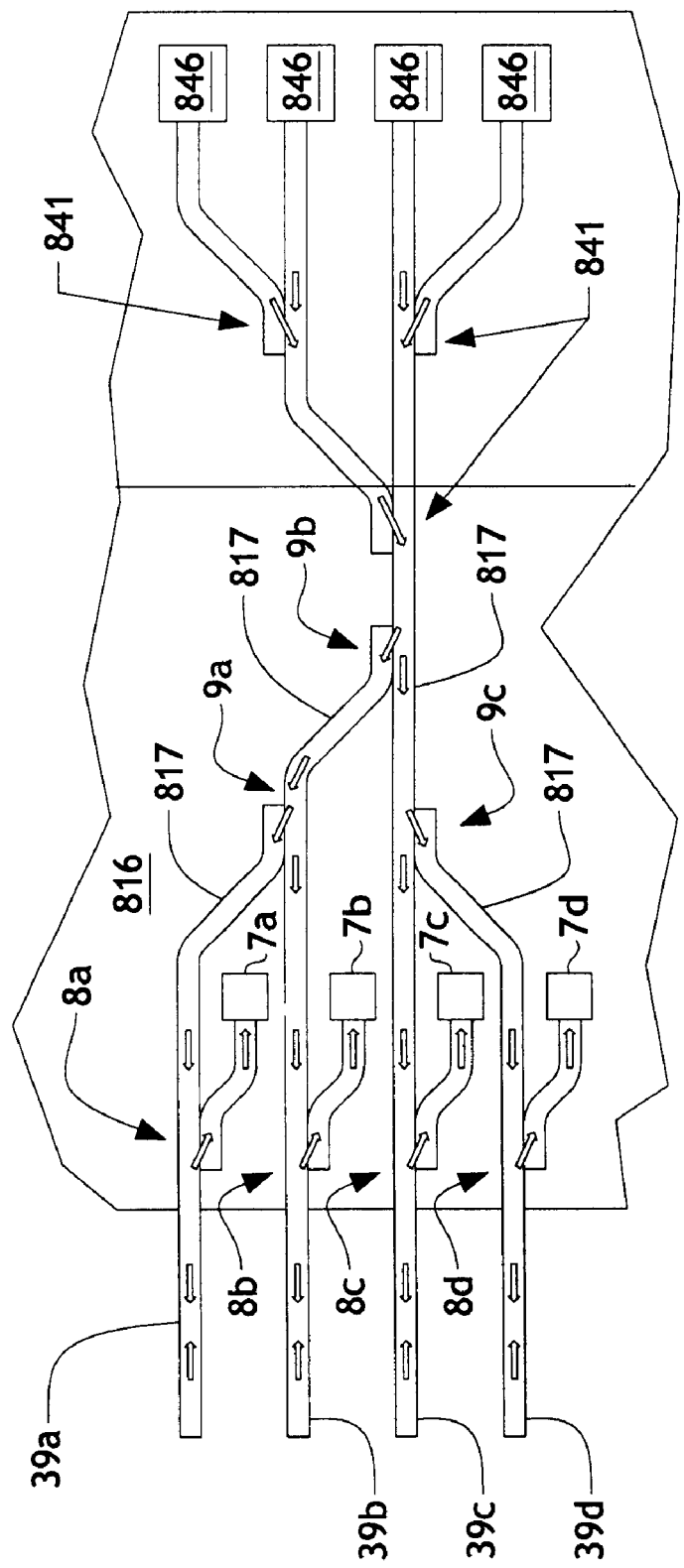
FIG. 12 illustrates a scanning head similar to the embodiment of FIG. 11 except that the light source employed combines the power of multiple individual light sources to produce light of sufficient intensity to write on the media. Alternatively, the additional light sources may serve as backup sources in case of failure of one source.

Referring to FIG. 12, VCSELs are presently limed to lower output power than edge-emitting lasers. For use in this invention, the outputs of several VCSELs 846 may be ganged, for example with phase locking, to provide power for writing when higher channel power levels are required. The laser array may be integrated with the optoelectronic chip to achieve low-loss coupling of the laser output into the chip waveguides 817. Interfacing the chip "switchyard" with the laser source, be it single laser or a ganged device as shown in FIG. 12, can be accomplished by attaching optical fibers between each laser and the switchyard input ("pigtailing"), using a hybrid arrangement with the laser array butt-coupled to the optoelectronic chip, or totally integrating the lasers in the optoelectronic chip.

The chip could also be designed with optical railtaps to allow crossover between the laser input channels, so that, in case of a laser failure, a neighboring or backup laser could be switched in to feed the outputs originally assigned to the source that failed. That is, for example, in the embodiment of FIG. 12, if one of the lasers 846 fails, another one can be switched in to provide a backup source. As described above, the same crossover feature is used to gang the output of several lasers to meet a scanning intensity requirement that exceeds the output of a single laser.

The return light from the surface is imaged back onto the tip of the emitting fiber and passes back into the chip where it is shunted by a respective directional coupling 8*a*–8*d* to a corresponding photo detector 7*a*–7*d*. Silicon-based devices provide response over the wavelength range from the near IR to visible blue light, and PIN-type (p+|intrinsic|n+) silicon photo diodes are simple, fast, long-lived, inexpensive devices routinely used in optical fiber data links and other applications at rates of 1 GHz and higher. These devices are integrated monolithically within a silicon substrate in the chip.

The novel scanning and light allocation design of the embodiments discussed above, and which are discussed further below, require switching speeds on the order of 20 nanoseconds when employed in optical data storage. Although electro-optic switching is required, this is not a stressing demand on the technology since sub-nanosecond switching times have been demonstrated. Similar technology has been employed for multi-output data transmission.

As discussed in the related applications incorporated herein by reference and elsewhere in this application, the laser light emitted from the tip of the properly designed fiber or waveguide diverges with a high numerical aperture (A) ratio. A simple, fast lens system with matching NA is used to focus the light emitted from the fiber tip or waveguide to a spot on the surface to be scanned. For high resolution scanning applications, the fibers are single mode. For optical data storage and other minimum scan spot size applications, the lens system is designed to produce the smallest practical diffraction limited spot on the scanned surface. The light reflected from the surface is collected and re-imaged by the same lens system back into the same fiber or waveguide tip. The fiber or waveguide carries the return light back into the optoelectronic chip for detection. The one-to-one mapping properties of the imaging system constrain the optics to focus back into each fiber tip all light that originates from the spot on the surface illuminated by that fiber tip and reject any light coming back from the target surface from another location. This acts as an aperture stop and has the effect of limiting cross-talk among parallel data channels fed by multiple scanning light spots. In this design, the lens system could be made from a single holographic element.

In the above embodiments, because each spot performs multiple, overlapping scans to sweep the area that it is reading, there is no need for micro-tracking systems to maintain micron-scale positioning of the spots on the surface. Precision autofocus control of the head as a unit will be necessary, as in conventional optical heads. The focus quality signal will be based on maximizing the signal level returned from a given surface area. When the light collected back into the fiber tip is maximized, the system is in focus.

Figure 13:
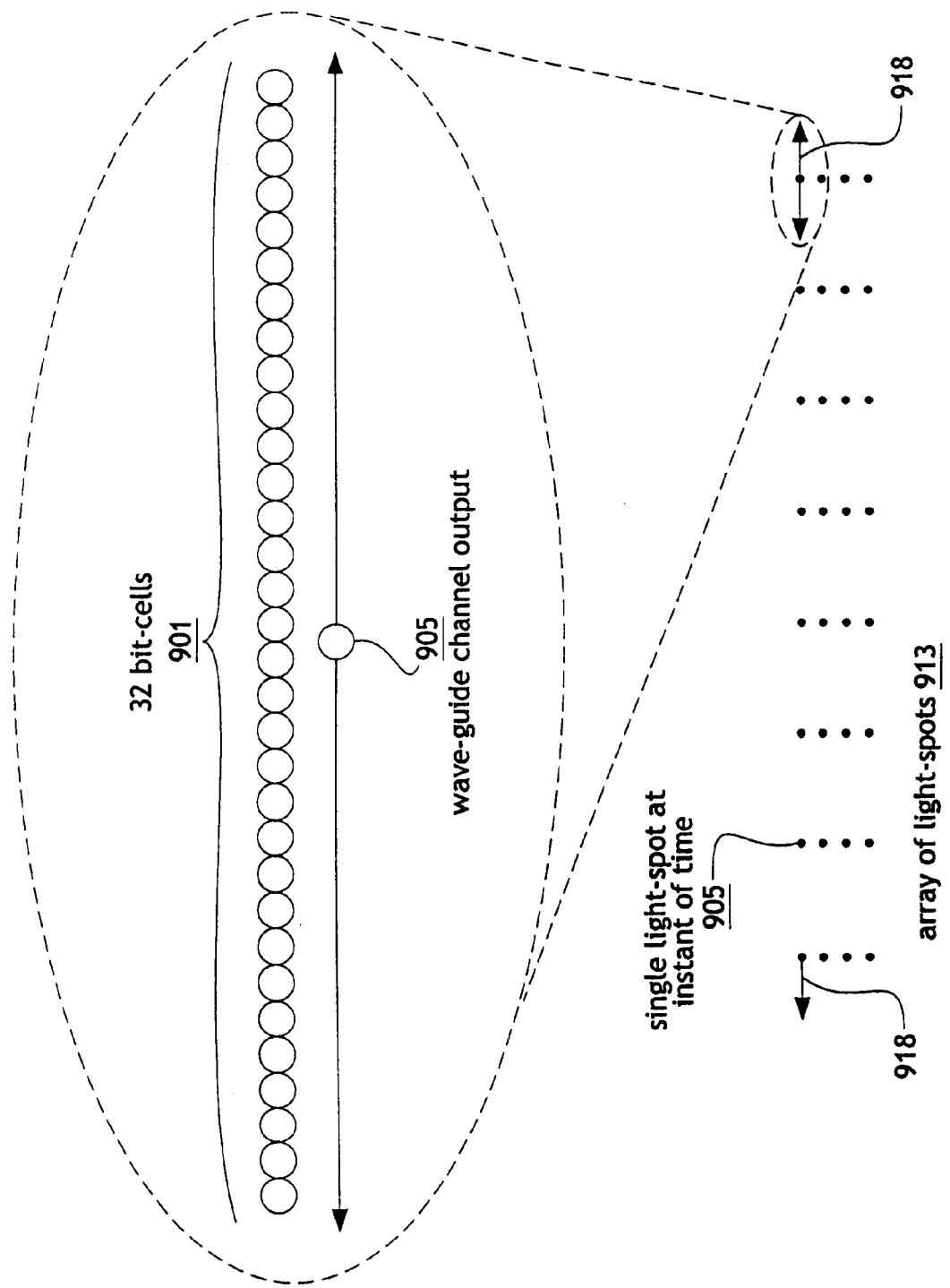
FIG. 13 illustrates an embodiment of a multiple channel scanning head where multiple columns of input apertures scan an identical region and image processing techniques are applied to the redundant data to enhance accuracy and increase throughput.

Referring to FIG. 13, to illustrate design issues for this invention, parameters are presented for an application example of the integrated head: read/write scanning of a digital optical data tape moving under it. The read/write head of this embodiment includes an 8 by 4 array of output apertures, either the ends of light waveguides or the tips of optical fibers according to any of the above embodiments. Each output aperture is spaced apart by 64 microns The data cells written and read are spaced on 1 micron centers so that an array of 32 bits cells 901, is covered by a ±32 micron sweep of each output aperture as the read/write head is oscillated.

Figure 14:
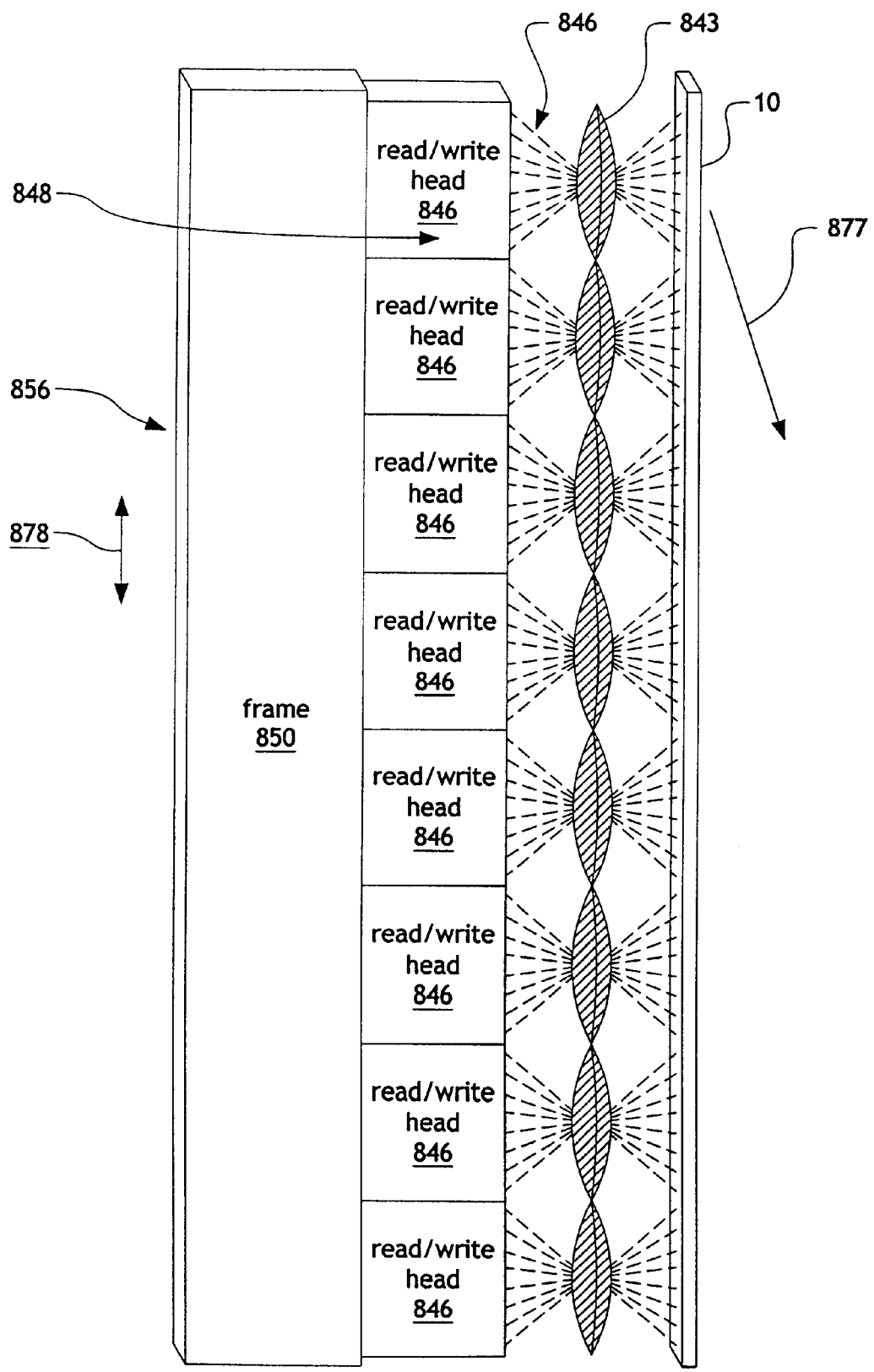
FIG. 14 is a simplified isometric rendering illustrating the embodiment of FIG. 13 with only one column of ray traces showing.

Phase-change optical media has shown the capacity to store readable bits in cells spaced center-to-center at the smallest practical diffraction limited spot diameter, which is of the order the laser wavelength. However, under optimal conditions, several techniques have been developed to achieve higher bit densities. The above design assumes 1×1 $\mu m^2$ data cell dimensions. Since each output aperture oscillates ±32 $\mu m$ the corresponding spot on a tape medium sweeps over a 64 $\mu m$ long strip perpendicular to the tape edge. As the nominal design has a 4×8 array of output apertures in a rectangle centered on the optical axis of a 1-mm aperture lens system, at any instant of time, the system projects a 4×8 array of light spots 913 on the target surface. The 8 output apertures in each column of the array are spaced on 64 $\mu m$ centers so that they cover a band 512 $\mu m$ across the tape. Referring to FIG. 14, a single module 848 consisting of read/write head 846 (a 4×8 array of output apertures) with a single imaging lens 843 may be duplicated eight-fold to produce a read/write head 856 spanning a full 4-mm width. The modules in the embodiment shown are arranged vertically and attached to a frame 850 for support. Such a read/write head 856 produces a 4 by 64 array of light spots. Although in the figure only eight central ray traces are shown at 846 projected by each module 848, it is to be understood that the embodiment includes four columns of eight ray bundles. The direction of motion of the medium relative to the read/write head 856 is indicated by the arrow 877. An arrow 878 indicates the direction of oscillation of the read/write head 856, but not the magnitude which is about the size of the spacing between adjacent output apertures as indicated by the spacing of the origins of the ray central traces shown at 846.

The four columns of output apertures along the translation direction of the medium relative to the read/write head allow the same area of the medium to be scanned independently four separate times for redundancy as the medium moves under the read/write head. In the write mode, the four scans may be used to: 1) read the tape surface for previously written data or fiducial marks to determine position; 2) write; 3) read to confirm what was written; 4) read again. Note that, preferably, the lens systems are offset from each other to cover the entire medium-displacement-path width, and thus a continuous band across the medium will not be read simultaneously.

To read or write 67 Mbits (8 MBytes) in 1 second for the above design on 4-mm tape, each fiber in a column must scan 1 Mb/s. With 64 bits per 64 $\mu m$ scan length, the fiber must complete at least 16,384 data scans per second. Because oscillation frequencies well above 100 kHz are easily achieved for MEMS systems, a fiber scan rate several times higher than this minimum can be used in the read mode. The net effect is that the set of 8 light spots from each column of fibers sweeps a 512 $\mu m$ wide band of the tape moving under it with enough oversampling that reflectivity data from each data bit is received multiple times. In the write mode, each fiber will oscillate at 16 kHz and write to 64 data cells in a column on the tape during one half of a cycle only. Half the fibers (32) may write during the downstroke, then the lasers will be switched to the other half that will write during the upstroke. This allows a 50% duty cycle for a laser to write through each output aperture; if each laser can supply enough power to two output apertures writing simultaneously, then 16 lasers can handle all 64 fiber channels in one column spanning the 4-mm tape width The vertical displacement (direction perpendicular to arrow 877, the direction of movement of the read/write head 856 relative to the scanned surface 10) of successive columns of output apertures in the embodiment of FIG. 14, for example, may be non-zero, but less than the data-cell pitch, so that each column of outputs scans a slightly different part of the surface. This vertical displacement may also be zero. In either case, preferably, the data streams from the detectors reading the return signals from each fiber are digitized and processed. Thus, all the streams from all four detectors are processed together so that data from successive sweeps of the same area (or almost the same area, when the vertical displacement of columns is non-zero) are presented to an image processing computer. Using known image-processing techniques (e.g., weighted averaging or most representative trace for each cell), this information can be used to provide a very fast, low error rate reading of the scanned surface pattern. The lateral spacing of the fibers in each array of fiber scanners (which determines the delay between the successive scans of the same surface area) is determined by a tradeoff between physical design constraints and data buffering/processing considerations. For the tape scanning application described next the optoelectronic switching functions and the MEMS system requires at least 50 MHz clock rates in an on-board controller.

Figure 19:
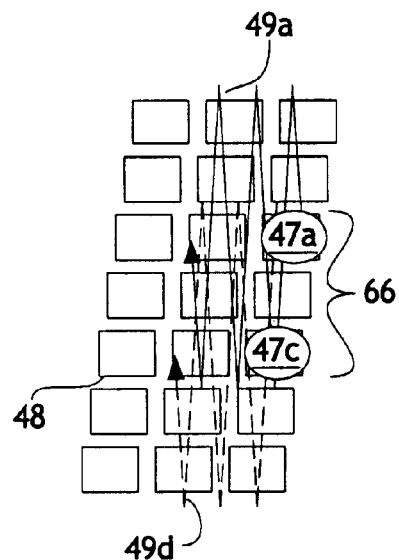

Note that while in the embodiments described, the size of the array of output apertures is 4 ×8, it is also possible to form arrays with other dimensions to obtain the same benefits. Also, the data cell size may be other than as described in the above embodiments. In any of the above embodiments, it is possible to project light, and receive light back from the scanned surface, by direct proximity of the output apertures as in FIG. 2 or by using imaging optics as in FIG. 14. Note also that the lasers could be switched on and off to modulate for writing rather than as in the preferred system described where optical switches are used for modulation. Note also that the image processing techniques discussed can take the form of different kinds of data encoding, so that data does not have to be written as separate data-cells. Other kinds of surface modulation techniques may be employed in connection with the invention and for each of these, redundant scanning will achieve similar benefits in terms of high reading rates, along with the benefits discussed above with respect to writing as well. In addition, referring to FIG. 19, it is also possible to arrange the output apertures and their spacing such that redundancy is provided by sweeping the scan spots over overlapping regions 66 by virtue of the range of motion of the oscillations. That is, instead of sweeping apertures spaced on a 64 micron pitch and sweeping ±32 microns, the sweep could be greater than the spot pitch so that the same areas are scanned more than once. Thus, spot 47a and 47c sweep the same region 66. Image processing could be applied to such data, buffered appropriately, as well. For a series of identically positioned scans performed serially across the same information area, the image processing step could be as simple as a democratic vote that takes the most agreed-on value among the 4 voting channels. For staggered apertures, the image processing step in the simplest case would be a best-fit to a series of stored expected images associated with each possible value (which could include known erroneous values).

Figure 15:
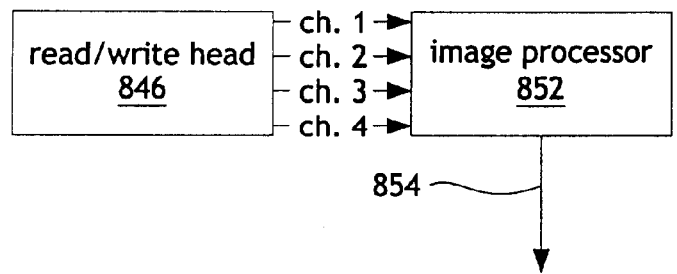
FIG. 15 illustrates the use of an image processing computer to process the data from multiple channels of redundant data for the embodiments of FIGS. 13 and 14.

Referring to FIG. 15, an image processor 852 receives multiple channel signals, each from a respective one of the detectors connected to the four apertures receiving signals from the same or nearly same region of the scanned surface. Image processor 852 receives the signal from read/write head 846. Only four channels are shown, but in the embodiment of FIG. 14, for example, 64 sets of 4 channels would be transmitted to be image-processed. The result of image processing is a prediction of the correct "value" of the cell read multiple times which may output as a serial data stream on line 854. The term "value" is used loosely here in that the data is stored as some sort of symbol which may correspond to multiple independent numeric values depending on the encoding scheme used. For example, the data could be recorded with multiple bits per mark (gray scale).

Figure 16:
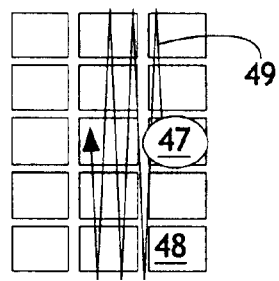
FIGS. 16–19 illustrate different ways of oversampling the scanned surface with variations of an embodiment of the invention.
Figure 17:
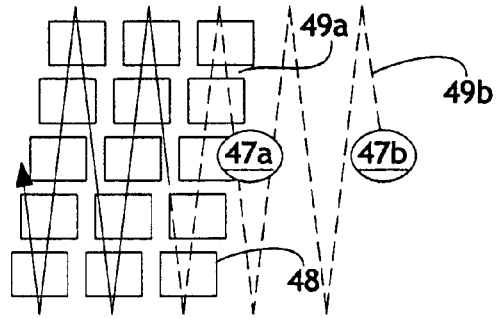
Figure 18:
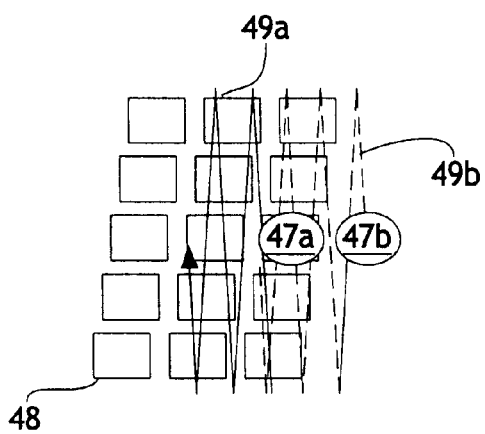

The above embodiment, where separate output apertures sweep the same regions of the scanned surface, is not the only way to oversample the target surface. Referring to FIGS. 16, 17, and 18, various alternative ways to achieve oversampling are shown. In FIG. 16, the output apertures 47 are staggered so that each sweeps over a different area The rate of oscillation relative to the rate of translation of the surface, indicated by the zig-zag line 49, is such that the same data cells 48 are scanned multiple times. In the embodiment described above and shown in FIG. 17, the multiple fiber (or, more generally, light-waveguide) configuration simply multiplies the data rate by scanning/reading with several light-spots over the same area. In the embodiment of FIG. 16, each spot scans a different area (and this would require the spots be staggered in the direction of the oscillation so that different spots do not sweep the same regions), but each spot scans the same area more than once. In the latter case, the operation of each spot while scanning and collecting data is essentially independent of the others. The physical configurations of these two alternatives is the same as depicted in the other figures.

In another embodiment such as described by FIG. 16, a cantilever-mounted fiber-optic bimorph, such as described in the applications incorporated by reference below, (for example, in the application entitled "Scanning Device Using Fiber Optic Bimorph.") are used to generate the light spot. In this case, a single light spot is generated by each bimorph. As shown in FIG. 16, in this embodiment, oversampling is accomplished by having a spot perform its scan oscillation with a frequency such that its center scans through a data cell several times before crossing the columnar boundary to the next data cell or region of the target surface.

For example, in an optical tape system, the data cells move past the scanning locus of the spot oscillation as the tape moves under the read/write head. The optical properties (e.g., reflectivity) of the data cell area are oversampled because more than one trace of the sampling spot passes through the data cell area, with the locus of each trace displaced from the previous one by some fraction of the data cell width. The best measure of the data cell can be formed by either processing the multiple traces together (e.g., weighted averaging) or by selecting a best or most representative data trace for each data cell.

Note that, the image-processing techniques can be applied in an embodiment of the invention in which the parallel columns of input apertures are offset relative to each other. That is, the data readings are semi-redundant in the sense that non-identical portions of the same data cells are read and image-processed. That is, slightly different portions of a data cell are read by each column of input apertures. The image-processing algorithms may have to take account of the offset (that is, have it predefined) and therefore be different from (or more generalized versions of - zero-offset is just a special case of variable offset) the algorithms applicable to a zero-offset situation. Although it is also possible to register the values of the offset by image processing. Obviously the scans will contain information about the repeating pattern which should make it possible to avoid specifying the offset a priori in the algorithm Also, the offset could be determined through calibration using a medium with known fiducials imprinted on it.

It is also possible to scan in a hybrid fashion such as shown in FIG. 18. In this case, the surface displacement rate and the oscillation speed are such that the spots sweep the same region multiple times, but, in addition, at least one successive scan spot 47b follows the first 47a and sweeps over the same region of the target surface. So redundant or partly redundant data are obtained in two ways at the same time.

The optical design discussed above avoids the use of costly, large aperture discrete optics through the use of integrated fabrication techniques that reduce alignment problems and allow low-cost manufacturing in quantity. In addition, the optoelectronic chip controls the light distribution and permits the use of many more scanning channels than lasers with low cost per added channel and very high parallel data transfer rates The optoelectronic chip also allows lithographically-determined, precise spacing of output apertures for separate laser sources. Also, the chip permits efficient use of laser power including ganging of low power sources such as VCSEL sources; and continuous wave laser operation during write mode. Moreover, the design achieves scanning action through optical fiber motion produced by either microelectromechanical systems (MEMS) technology or a known micro scale vibratory motion technique such as a piezoelectric transducer. In addition, the invention includes the use of parallel, redundant laser scanning, a low-cross-talk design, and an "image analysis" approach to signal processing.

The best MEMS scanning method depends on the practical engineering tradeoffs attending the specific application. For example, the mass of the moving element, the amplitude of the oscillation, and the frequency. One optimization goal might be to opt for high frequency and therefore favor minimum mass of the moving element. This would suggest an individual fiber is best. Engineering, however, places other constraints on the application, for example, the actual position of the surface emitting the light relative to the focal point of the optics. See for example, Brei et. al, incorporated herein by reference below.

Regarding the manufacturing of MEMS devices, for example, the light emitting aperture, shape and surface treatment, manufacturing issues are not a problem. For example methods have been developed to apply metals to glass fibers to enable capacitive coupling for driving the fiber motion. Individual methods of fabrication and then manufacture may be addressed depending on the availability of resources, e.g. metallization of a polymer "fiber" or waveguide, or application of piezoelectric material to a polymer. Regarding the optical properties of the fiber output, particularly with regard to numerical aperture (NA), some trial-and-error experimentation may be required to achieve an optimum configuration. If constructed layer by layer, the fiber tip construction is totally conventional. The optical quality and properties of the exit aperture as mentioned above are critical, and therefore exact recipes may require some trial-and-error experimentation. For example, a graded index clad may be necessary, or new process methods due to required design considerations. In an embodiment employing an optical fiber, the exit aperture may be defined by cleaving. In an embodiment employing a multilayer (e.g., polymer) structure, processing at the end of the fiber is important. Conventional methods at present include ion beam "polishing" of the tip or exit aperture.

The cantilever "style" vibrating fiber structure requires a waveguiding "core," as with any optical fiber. Also a cladding is required to confine the optical energy. The fiber, or, more generally, light guide, can have a round, square, or rectangular cross section depending on design considerations for the purpose of light "piping." A square or rectangular cross section is easiest to deal with from a manufacturing and fabrication point of view, as well as from the point of view of driving oscillations. Planar "capacitive" plates are easily implemented in a layered, bimorph configuration that optimizes energy transfer for driving oscillation while minimizing the required power. However, this puts severe constraints on optical design due to the need for polarization conservation elsewhere in the system, as well as mode conservation and balance. A layer by layer fabrication process is the best approach; in that case, the "fixed end" of the fiber is on top of the underlying structural and functional layers. The quality checks necessary are both optical and mechanical. Longevity will be related to mechanical work with frequency, total number of oscillations, material, composite structures, adhesion, etc. also being contributing factors.

Note, regarding a fundamental mechanism of failure in stressed single crystal materials, such as Si, defects in single crystals diffuse thermal and aggregate in the material. This is well known (see for example Silicon Processing for the VLSI Era, S. Wolf and R. N. Tauber, Lattice Press and other books addressing the processes in Si fabrication, particularly crystal growth). Note that various embodiments could make use of the same lasers for both reading and writing, as discussed above. In such a case, a head could have separate exit apertures for reading and for writing, or have one set of apertures serving both functions.

The respective entireties of the following United States patent applications, filed concurrently herewith, are hereby incorporated by reference in the present application:

Scanning Device Using Fiber Optic Bimorph (Adam Thomas Drobot, Robert Courtney White)

Multiple Parallel Source Scanning Device (Adam Thomas Drobot, Robert Courtney White, Newell Convers Wyeth)

Multiple Channel Data Writing Device (Adam Thomas Drobot, Robert Courtney White, Newell Convers Wyeth, Albert Myron Green)

Multiple Channel Scanning Device Using Optoelectronic Switching (Adam Thomas Drobot, Robert Courtney White, Newell Convers Wyeth)

Method and Apparatus for Controlling the Focus of a Read/Write Head for an Optical Scanner (Edward Alan Phillips, Newell Convers Wyeth)

Multiple Channel Scanning Device Using Oversampling and Image Processing to Increase Throughput (Adam Thomas Drobot, Robert Courtney White, Newell Convers Wyeth, Albert Myron Green, Edward Alan Phillips)

The respective entireties of the following references are hereby incorporated by reference in the present application:

M. Ataka, A Omodaka, N. Takeshima, and H. Fujita, "Fabrication and Operation of Polyimide Bimorph Actuators for a Ciliary Motion System", JMEMS, Volume 2, No. 4, page 146.

D. E. Brei and J. Blechschmidt, "Design and Static Modeling of a Semicircular Polymeric Piezoelectric Microactuator", JMEMS, Volume 1, No. 3, page 106.

J. W. Judy, R. S. Muller, and H. H. Zappe, "Magnetic Microactuation of Polysilicon Flexure Structures", JMEMS, Volume 4, No. 4, page 162.

T. S. Low and W. Guo, "Modeling of a Three-Layer Piezoelectric Bimorph Beam with Hysteresis", JMEMS.

Q. Meng, M. Mehregany, and R. L. Mullen, "Theoretical Modeling of Microfabricated Beams with Elastically Restrained Supports", JMEMS, Volume 2, No. 3, page 128 et. seq.

K. Minami, S. Kawamura, and M. Esashi, "Fabrication of Distributed Electrostatic Micro Actuator (DEMA)", JMEMS, Volume 2, No. 3, page 121 et. seq.

J. G. Smits, and A. Ballato, "Dynamic Admittance Matrix of Piezoelectric Cantilever Bimorphs", JMEMS, Volume 3, No. 3, page 105 et. seq.

Yuji Uenishi, Hedeno Tanaka, and Hiroo Ukita, NTT Interdisciplinary Research Laboratories (Tokyo, Japan), "AlGaAs/GaAs micromachining for monolithic integration of optical and mechanical components", Optical power driven cantilever resonator. Proceedings SPIE et. seq.

What is claimed is:

1. A scanning device for scanning a target surface having data written thereon, said data being arranged in adjacent data cells on said target surface, each of said cells having one of a set of possible configurations representing data, the device comprising:

a read/write head with at least one reading laser source connected to emit light from an array of output apertures and receive light through an array of input apertures;

an image processor;

said read/write head and said target surface being supported to move relative to each other to scan said target surface;

said array of output apertures being arranged such that multiple ones of said output apertures scan substantially a same cell of said surface;

said read/write head including detectors to produce detection signals, each corresponding to a respective one of said array of input apertures and connected to said image processor; and said image processor receives said detection signals and is configured to process said detection signals to generate an estimate of a configuration of said same cell and to generate a signal stream representing said estimate.

2. A device as in claim 1, wherein said output apertures are coaxial with said input apertures.

3. A device as in claim 1, wherein said read/write head includes a optoelectronic chip having light guides formed therein, each of said light guides being connected to a one of said output apertures.

4. A device as in claim 1, wherein said optoelectronic chip includes at least one optical switch to modulate an output of one of said reading laser source and a writing laser source.

5. A device as in claim 4, wherein said at least one optical switch modulates said laser source by selectively directing said output between a write output aperture and another direction leading ultimately to dissipation of energy of said writing laser source, whereby said writing laser source is enabled to operate in a continuous manner while writing.

6. A device as in claim 1, wherein said read/write head further comprises multiple reading laser sources, each connected to an array of light guides interconnected to split a laser output of said each of said multiple reading laser sources into multiple paths, each connected to a one of said output apertures.

7. A device as in claim 6, wherein said array of light guides are interconnected with respective optical switches controlled by a controller programmed to cause said laser output to be shared among multiple ones of said output apertures by shunting said laser output to a first fraction of said multiple ones of said output apertures at a first time and shunting said laser output to a second fraction of said multiple ones of said output apertures at a second time.

8. A device as in claim 7, wherein said first fraction of said multiple ones of said output apertures is equal to a single one of said output apertures.

9. A device as in claim 1, wherein:

said read/write head further comprises multiple reading laser sources, each connected to an array of light guides interconnected to split a laser output of said each of said multiple reading laser sources into multiple paths defined by said light guides, each path being connected to a one of said output apertures; and said array of light guides are interconnected with respective optical switches controlled by a controller programmed to cause said laser output to be shared among multiple ones of said output apertures by shunting a percentage of said laser output to a first fraction of said multiple ones at a first time and shunting a second fraction of said laser output to second fraction of said multiple ones at a second time.

10. A scanning device for scanning a target surface having data written thereon, said data being arranged in columns of adjacent data cells on said target surface, each of said columns of data cells having one of a set of possible configurations representing data, the device comprising:

a read/write head with an array of input apertures arranged in successive columns such that each of said columns receives reflected light from a same one of said columns of data cells;

at least one detector connected to detect light received by said array of input apertures;

said array of input apertures sampling more than once at least a portion of said data cells; and said detector generating a signal indicating an estimate of a one of said possible configurations by combining information derived from light received by all of said input apertures.

11. A device as in claim 10, wherein said detector combines said information by detecting light from each of said columns and synthesizing an improved estimate of said one of said possible configurations from a combination of signals generated thereby.

12. A scanning device for scanning a target surface having data written thereon, said data being arranged in columns of adjacent data cells on said target surface, each of said columns of data cells having one of a set of possible configurations representing data, the device comprising:

a scanning head with an array of input apertures arranged in successive columns such that each of said columns receives reflected light from a same one of said columns of data cells;

at least one detector connected to detect light received by said array of input apertures;

said array of input apertures sampling more than once at least a portion of said data cells; and said detector generating a signal indicating an estimate of one of said possible configurations by combining information derived from light received by all of said input apertures.

13. A device as in claim 12, wherein said scanning head includes at least one laser connected to conduct light to said array of input apertures, whereby said array of input apertures functions as an array of output apertures from which light is emitted.

14. A device as in claim 13, further comprising an imaging optical element positioned between said scanning head and said target surface to image light emitted from said output apertures onto said target surface, said light from said same one of said columns of data cells being light emitted from said array of output apertures, returned from said target surface, and imaged by said imaging optical element back onto said input apertures.

15. A device as in claim 14, wherein at least one detector is an array of detectors, each being respective of one of said array of input apertures and said scanning head includes a light guide leading from each of said input apertures of said array of input apertures to said respective detector.

16. A method of reading data from a recorded surface having successive columns of data cells, said successive columns comprising at least one row of said data cells, comprising the steps of:

moving said recorded surface such that light from a first output aperture is focused onto a first of said successive columns;

receiving light returned from said recorded surface responsively to said first step of moving said recorded surface;

detecting light returned to said first output aperture and storing a first result thereof;

moving said recorded surface such that light from a second output aperture is focused onto said first of said successive columns;

receiving light returned from said recorded surface responsively to said second step of moving;

detecting light returned to said second output aperture and storing a second result thereof; and calculating data represented by said first of said respective columns responsively to a computed combination of said fist and second results.

17. A method as in claim 16, wherein:

said first step of receiving includes receiving light at a first input aperture corresponding to said first output aperture; and said second step of receiving includes receiving light at a second input aperture corresponding to said second output aperture.

18. A scanning device for scanning a target surface with data written thereon, said data being arranged in data cells each having one of a set of possible configurations representing data, comprising:

a scanning head with an array of input apertures arranged such that each of said input apertures receives light reflected from said target surface from a same data cell;

at least one detector configured to detect light received by said array of input apertures; said detector generating a signal indicating an estimate of one of said possible configurations by combining information derived from light received by all of said input apertures;

a frame connected to said scanning head; and an oscillating motor connected between said frame and said scanning head to oscillate said scanning head relative to said target surface.

19. A device as in claim 18, wherein said medium is moved continuously in said first direction at a constant speed.

20. A device as in claim 18, wherein a direction of an oscillation of said read/write head has a component substantially perpendicular to said first direction.

21. A device as in claim 20, wherein said scanning head includes at least one laser connected to conduct light to said array of input apertures, whereby said array of input apertures functions as an array of output apertures from which light is emitted.

22. A device as in claim 21, further comprising an imaging optical element positioned between said scanning head and said target surface to image light emitted from said output apertures onto said target surface, said light from said same one of said columns of data cells being light emitted from said array of output apertures, returned from said target surface, and imaged by said imaging optical element back onto said input apertures.

23. A device as in claim 22, wherein at least one detector is an array of detectors, each being respective of one of said array of input apertures and said scanning head includes a light guide leading from each of said input apertures of said array of input apertures to said respective detector.

24. A scanning device for scanning a target surface having data cells written thereon, the device comprising:

a light source;

a first output aperture coupled to said light source and configured to emit light onto a data cell and receive light reflected from said data cell;

a second output aperture coupled to said light source and configured to emit light onto said data cell and receive light reflected from said data cell;

at least one detector coupled to said first and second output apertures that detects said reflected light and generates a first detection signal corresponding to light received at said first output aperture and a second detection signal that corresponds to light received at said second output aperture;

an image processor that receives said first and second detection signals and is configured to process said first and second detection signals to generate an estimate value of said data cell.

25. A scanning device for scanning a target surface with data cells comprising:

a scanning head with an array of input apertures that receive light reflected from said target surface from a same one of said data cells;

at least one detector configured to detect light received by said array of input apertures; said detector generating a signal indicating an estimate of one of a set of possible configurations of said same one of said data cells by combining information derived from light received by all of said input apertures; and an oscillating motor connected to said scanning head to oscillate said scanning head relative to said target surface.

26. A scanning device for scanning a target surface with data cells written thereon, comprising:

a scanning head with an array of input apertures arranged in successive columns such that each of said input apertures receives light reflected from said target surface from a same one of said data cells;

at least one detector that detects light received by said array of input apertures; said detector generating a signal representing an estimate of one of a set of possible data value configurations by combining information derived from light received by all of said input apertures; and an oscillating motor connected to said scanning head to oscillate said scanning head.

* * * * *